United States Patent [19]

Pecaro

[11] 4,036,435
[45] July 19, 1977

[54] DRIP IRRIGATION EMITTER

[76] Inventor: George J. Pecaro, P.O. Box 633, Pauma Valley, Calif. 92061

[21] Appl. No.: 598,250

[22] Filed: July 23, 1975

[51] Int. Cl.² .......... B05B 1/32; B05B 15/02
[52] U.S. Cl. .............. 239/116; 137/543.15; 239/452; 239/542; 239/570
[58] Field of Search .............. 239/266–269, 239/450, 452, 453, 459, 562, 570, 583, 542, 114–118; 137/540, 543.15

[56] References Cited

U.S. PATENT DOCUMENTS

| 713,852 | 11/1902 | Chapin | 239/117 |
|---|---|---|---|
| 2,367,106 | 1/1945 | Dolch | 137/540 |
| 3,080,885 | 3/1963 | Webster et al. | 239/562 X |
| 3,685,735 | 8/1972 | Foster | 239/114 X |
| 3,693,888 | 9/1972 | Rondas et al. | 239/542 X |
| 3,736,955 | 6/1973 | Schlesser | 239/542 |
| 3,810,582 | 5/1974 | Lodge | 239/542 |

FOREIGN PATENT DOCUMENTS 945,664   1/1964   United Kingdom .......... 137/540

Primary Examiner—Evon C. Blunk
Assistant Examiner—Andres Kashnikow
Attorney, Agent, or Firm—Armstrong, Nikaido & Marmelstein

[57] ABSTRACT

An improved drip irrigation emitter for use in drip irrigation systems, the drip irrigation emitter including a hollow body with at least one outlet port and an inlet connector for receiving fluid from main supply lines, a collar with a center bore movably retained within the hollow body, a tapered pin fixedly attached to the emitter and projecting into the collar bore to form an orifice defined as the volume space between the boundary of the bore and the pin periphery for permitting fluid flow between the inlet and outlet ports and a spring assembly for transmitting a continuously variable yieldable force on the collar in a direction to close the orifice.

12 Claims, 6 Drawing Figures

4,036,435

DRIP IRRIGATION EMITTER

BACKGROUND OF THE INVENTION

1. Field of the Invention

The invention is in the field of irrigation control systems for agricultural purposes, and particularly relates to drip irrigation emitters, which provide irrigation of plants and trees at relatively slow rates.

2. Description of the Prior Art

The concept of drip irrigation was developed several years ago as a technique for irrigating plants and trees with a minimum of water. According to this concept, fluid supply lines are fitted with devices, known as emitters, which are placed in close proximity to plant root areas. Drip emitters, as distinguished from water sprinklers, spinners or spitters, emit a very small volume of water per unit time. This slow flow rate of fluid discharge allows the soil to fully absorb the water where it is moved by capillary action. As is known to those skilled in the art, excessive flow rate leads to water waste through run off and evaporation. Water run off has the additional disadvantage that excess watering of down slope plants and trees occurs where plants and trees grow on hilly terrain.

For an emitter to be truly effective, several design criteria must be met. Emitters must permit water application at predetermined constant flow rates so as to limit the flow of water across the soil surface, yet provide sufficient moisture to meet the demands of the plants and trees.

They should also be self-cleaning, that is, they should include an internal system which automatically removes water carried minerals and organic matter deposited on emitter parts. Since the emitter outlets through which water flows are small, they often become clogged by foreign matter carried by the water. Any restriction in water flow through the emitter can upset the uniformly of water distribution causing plant damage before the restriction can be detected. The self-cleaning feature allows for the automatic removal of deposited foreign substances.

The emitter should allow the predetermined output flow rate to remain relatively constant, independent of variation in input water pressure. It is also highly advantageous if the predetermined flow rate could be easily and quickly varied over a wide range. Along with the above listed criteria, emitters should provide a positive shut-off against the back flow of water from the main supply line after the main supply is shut off. This feature is particularly important in steep slope areas where the water line is drained through lower emitters after water shut-off, resulting in a waste of water and/or nutrients dissolved in the water used for the fertilization of plants during the irrigation process.

Although various emitters are known, such as those shown in U.S. Pat. Nos. 3,685,735, 3,719,327 and 3,810,582, none have been designed to successfully meet all of the above design criteria.

SUMMARY OF THE INVENTION

It is an object of my invention to provide an improved emitter design which permits the application of water to plants and trees at a predetermined constant flow rate over a wide range of incoming water pressures.

Another object of the invention is to provide an emitter which can emit a controlled graduated rate of flow over a wide range of outlet flow rates.

Another object of the invention is to provide an emitter which can emit a controlled graduated rate of flow over a wide range of outlet flow rates in the presence of a wide range of water inlet pressures.

A still further object of this invention is to provide an emitter with a reliable self-cleaning feature.

An additional object of the invention is to provide an emitter which provides positive shut-off against water back flow through the main supply line, preventing excessive watering of plants.

These an other objects of the present invention are accomplished with the improved drip irrigation emitter of the present invention described more fully hereinbelow. The emitter is constructed of an elongated hollow body, one end of which contains an inlet connector for receiving incoming water and/or fertilizer solution. The other end of the emitter body is fitted with a fluid flow adjusting capping mechanism. A pin, with a tapered end functioning as a reamer, is fixedly attached to the emitter and extends axially within the interior of the hollow body. A collar is positioned about the tapered end of the pin, the collar being axially movable to form a varying volume orifice for fluid flow between the collar and the pin. Sealing means are provided to prevent fluid flow between the interior body walls and the collar, thereby preventing fluid flow between the inlet and outlet other than through the orifice. A spring member, constrained between the adjustable capping member and the collar creates an axial force on the collar, forcing it in a direction to close the orifice in the absence of incoming water.

BRIEF DESCRIPTION OF THE DRAWINGS

The invention will now be described with reference to the accompanying drawings wherein.

DETAILED DESCRIPTION OF THE PREFERRED EMBODIMENTS

Figure 1:
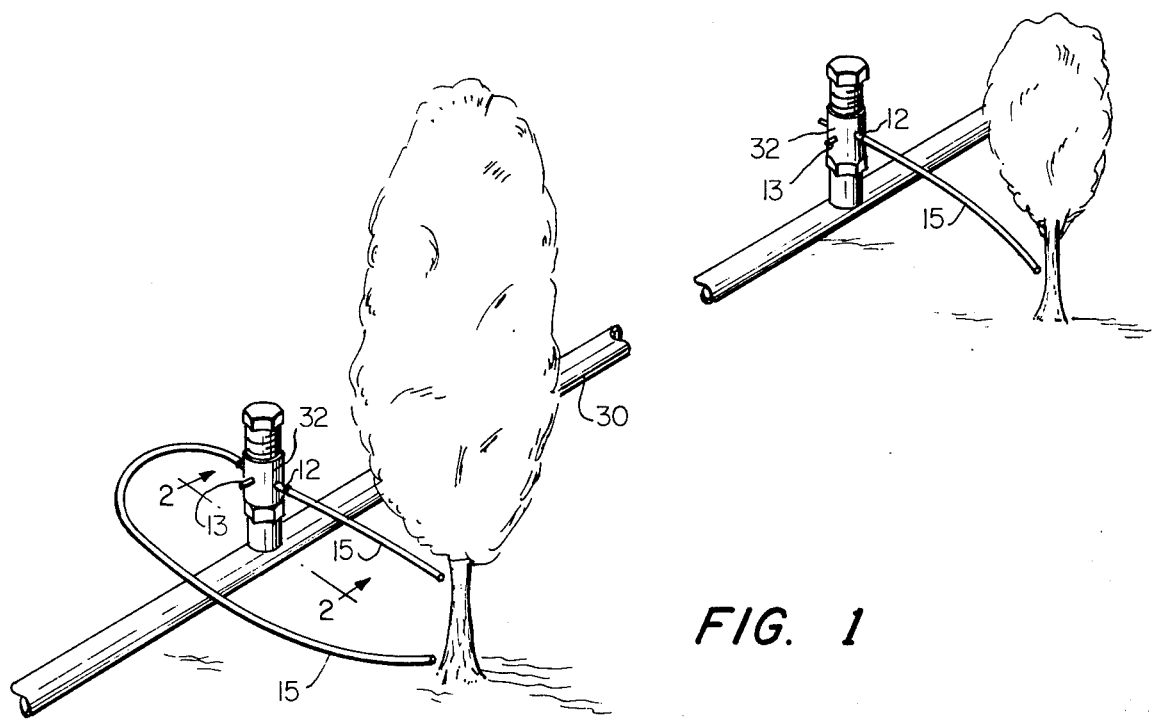
FIG. 1 is a perspective view of two emitters shown controlling fluid flow to trees of different sizes.
Figure 2:
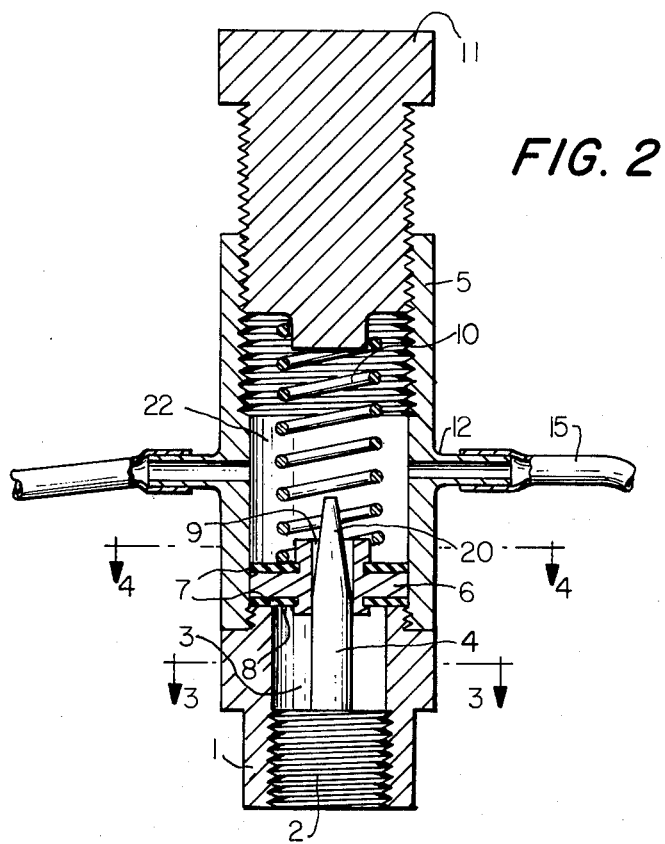
FIG. 2 is a vertical cross sectional view through an emitter taken along line 2—2 of FIG. 1.
Figure 3:
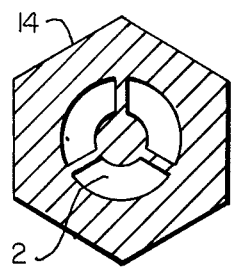
FIG. 3 is a horizontal cross section taken on the line 3—3 of FIG. 2.

FIG. 1 illustrates a drip irrigation system, including a water or other fluid supply line 30, with drip emitters 32, wherein each drip emitter includes at least one outlet port 12, to which is attached a flexible tubing 15 directing water to a particular location about the plant being irrigated.

FIGS. 2-5 illustrate the construction details of the emitter of the present invention. The emitter includes a hollow body 5 with outlet ports 12. Flexible tubing 15 may be fitted over the ports 12 to carry the water away from the emitter. One end of the hollow body 5 is closed by inlet connector 1 with ports 2 to allow the entry of water from the main supply lines into the lower chamber 3 of the emitter. The connector 1 includes a threaded area for connecting the emitter to the supply lines. The inlet connector 1 is preferably screw-thread connected to the body 5. The other end of the body 5 is closed by an adjustable capping member 11. The capping member 11 has a screw-thread connection to the body 5 and a hex nut top to allow continuous axial displacement of the capping member with a wrench or pliers. Pin 4 with tapered end 20 is fixedly attached to the inlet connector 1. An axially movable coolar 6 is positioned within the hollow body with the pin projecting into the collar bore. The volume space between the bore and the pin periphery defines an orifice 9 for carrying fluid between the inlet ports 2 and outlet ports 12. Gaskets 7 provide a fluid seal between the interior walls of the hollow body 5 and the collar edges to prevent fluid flow between the inlet and outlet in this area. The inlet connector is also provided with seat 8. A spring 10, constrained between the collar 6 and capping member 11 provides a yieldable force on collar 6 in a direction causing the collar 6 to move toward the seat 8 to close the orifice and prevent water from flowing between the inlet or lower chamber 3 and outlet or upper chamber 22. The extent of the projection of the capping member 11 into the hollow body 5 determines the spring force on collar 6.

Figure 4:
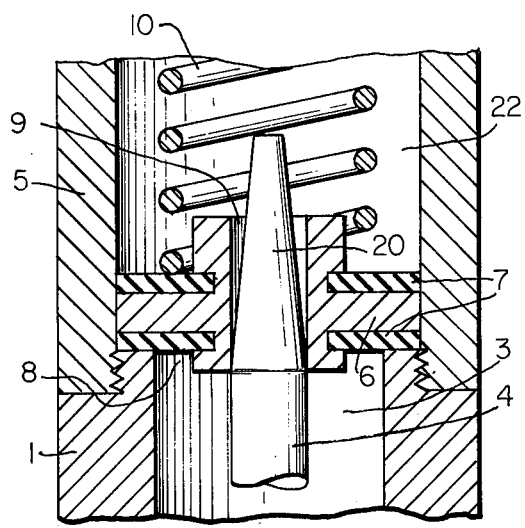
FIG. 4 is an enlarged fragmentary cross sectional view showing the emitter fully closed.

The operation of the emitter may best be described with reference to FIGS. 4 and 5. FIG. 4 illustrates the position of the collar 6 in the absence of inlet water pressure. Under these circumstances, collar 6 is forced, under the action of spring 10, into contact with the seat 8 closing the orifice 9. In this position the back flow of water from the main supply line 30, after the water is shut off, is prevented.

Figure 5:
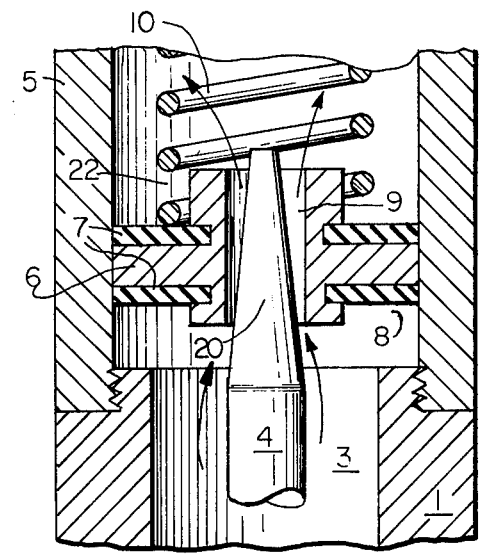
FIG. 5 is an enlarged fragmentary cross sectional view similar to FIG. 4, but with the emitter partially open to allow flow of fluid.
Figure 6:
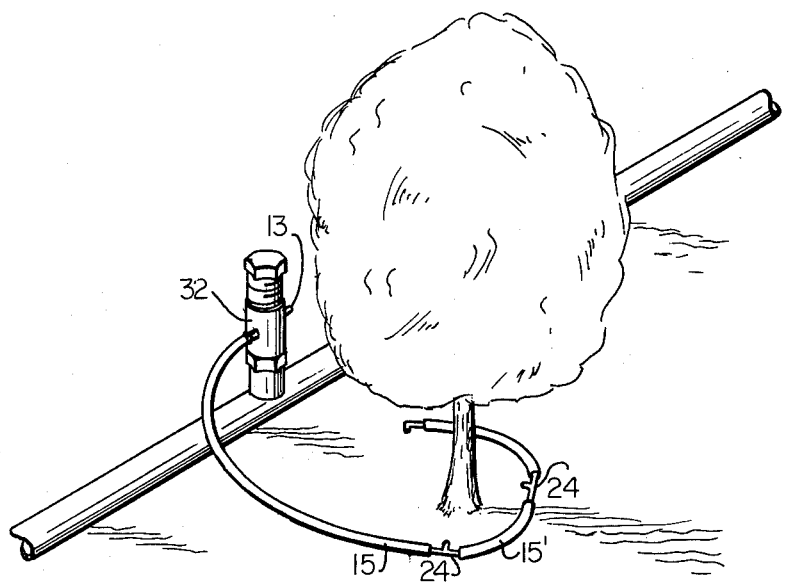
FIG. 6 is a perspective view of the emitter shown as a regulating master control unit controlling fluid flow, distributing water to a large root area at several locations through a supply line having several reduced area outlets to maintain uniform water flow from each outlet.

As shown in FIG. 5, when the water in the supply line 30 is turned on, it enters inlet ports 2 of the connector 1, and creates an upward force on the underside of collar 6, forcing the collar to move upwards against the force of the spring 10 opening the orifice 9 to allow water flow to the upper chamber 22 and out of the emitter through the outlet ports 12. The collar 6 continues to lift and the spring 10 compreses until the pressure on the spring 10, preset by the position of the adjustable capping member 11, equals the water pressure against the underside of collar 6 at which time the desired volume of orifice 9 is obtained. This permits the intended water volume to be discharged through the outlets 12 to the plants in the area of the emitter. The arrows in FIGS. 6 illustrate the direction of the water flow.

As the water in the main supply line 30 is shut off, the spring force drives the collar 6 down against the seat 8. This action causes the tapered end 20 of the pin 4 to ream out the bore in the collar 6, thereby removing any accumulated foreign matter. It should be noted that the foreign matter is ejected into the upper chamber 22 from where it will be forced out of the emitter through the outlet ports 12 the next time water is caused to flow in the supply lines.

If it is desired to convey water away from the emitter location to other root areas of the plant, sections of the flexible outlet tubing 15 are connected to one or more of the outlet ports 12. The emitter is preferably designed with multiple ports 12, all or some of which can be employed to vary the watering process. If it is desired not to allow water flow from any one or more of the outlet ports 12, plastic caps 13 can be fitted over selected pots 12, preventing water outlet flow.

The provision of the adjustable capping member 11 operative to continuously adjust the spring force on the collar 6 allows for a controlled graduated rate of flow of one gallon per hour to 60 gallons per hour over a wide range of inlet pressures, as for example, 5 pounds per square inch to 100 pounds per square inch. This wide range of flow capacity permits the emitter of the present invention to be used as a master control unit, supplying regulated amounts of water to several outlets arranged to irrigate a mature tree which requires more water at various locations around the root structure than a young tree.

The operation of the emitter as a master control unit is illustrated in FIG. 6. One port of the emitter 32 is fitted with a length of flexible tubing 15. The free end of tubing 15, is fitted with a reducing tee 24. A second length of flexible tubing 15' is connected to the tee fitting outlet. Additional tee fittings and lengths of tubing may be used as required. The free end of the last length of tubing would be fitted with either a reducing nozzle or a reducing elbow. Proper water pressure is achieved by adjusting the adjustable capping head 11 of the master control emitter. While the above method of distributing water around a tree utilizing lengths of tubing and tee outlets is described, other methods can be employed, such as a single length of tubing of sufficient length to circle the tree, perforated at intervals to supply water outlets.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims, rather than the foregoing description, and all changes which come within the meaning and range of equivalence of the claims are, therefore, to be embraced therein.

I claim:

1. A drip irrigation emitter for controlling the flow of fluid in an irrigation system comprising:
    a. a hollow elongated body having a hollow interior and at least one outlet port;
    b. an inlet connector fitting into an end of said hollow body;
    c. a pin member fixedly attached to said inlet connector and extending axially within said hollow body;
    d. a collar member axially movable within said hollow body, said collar member having a center bore with said pin member projecting into said bore to form a varying volume orifice defined as the space between the boundary of the bore and the periphery of the pin member wherein the flow of said fluid through said emitter is controlled by the size of said orifice;
    e. a seat member extending radially from the interior of the hollow elongated body;
    f. means for transmitting a yieldable force to said collar member in a direction opposite to the direction of flow of said fluid through said emitter, urging it toward said seat member; and
    g. adjuster means coupled to said yieldable force transmitting means for adjusting the yieldable force exerted thereby, wherein said adjuster means are positioned on said hollow body such that said adjuster means can be adjusted exteriorly from said hollow body.

2. The drip irrigation emitter of claim 1, wherein said pin member is shaped to continuously vary the orifice volume in response to movement of the collar member relative to the pin member.

3. The drip irrigation emitter of claim 2, wherein said pin member includes a tapered end portion projecting into the collar bore.

4. The drip irrigation emitter of claim 1, wherein said adjuster means includes an axially adjustable capping member cooperating with said yieldable force transmitting means to control the yieldable force exerted on said collar member.

5. The drip irrigation emitter of claim 4, wherein said axially adjustable capping member is threadedly connected to said hollow body, whereby the yieldable force on said collar member is continuously varied by varying the penetration of said capping member into said hollow body.

6. The drip irrigation emitter of claim 5, wherein said yieldable force transmitting means comprises an axially extending spring within said hollow body between the said adjustable capping member and collar member, said adjustable capping member being operative to control the force of the spring on the collar member.

7. The drip irrigation emitter of claim 1, wherein said hollow body further includes multiple outlet ports, said emitter further including detachable flexible tubing coupled to at least one outlet port to carry fluid to a location remote from the emitter.

8. The drip irrigation emitter of claim 7, further including a reducing tee connected to the free end of said flexible tubing and a second detachable flexible tubing connected to the outlet of the reducing tee, whereby the emitter operates as a master control unit supplying regulated amounts of fluid to multiple locations from a single outlet port.

9. The drip irrigation emitter of claim 1, wherein said pin member is shaped to ream out foreign matter from the center bore in said collar member when said collar member moves toward said seat member in response to the urging of said yieldable force means, and wherein the foreign matter reamed out is moved toward said outlet port of said bore.

10. An irrigation system including a fluid supply line and drip irrigation emitters, each of said emitters comprising:
   a. a hollow elongated body, having at least one outlet port;
   b. an inlet connector forming an end portion of said hollow body and removably connected to said fluid supply line to allow fluid from said supply line to enter said hollow body;
   c. a collar member and a pin member projecting into the bore of said collar member, said pin and collar members being within said hollow body between said inlet connector and outlet port, said pin member being fixedly attached to a portion of said emitter, so as to be non-movable relative to the hollow body, said pin member being shaped to form a varying volume orifice between the bore and pin as the said collar moves relative to said pin wherein the flow of liquid through said emitter is controlled by the size of said orifice;
   d. means for transmitting a yieldable force to said collar member in a direction tending to reduce the orifice volume said direction being opposite to the direction of flow of fluid through said emitter; and
   e. adjuster means coupled to said yieldable force transmitting means for adjusting the yieldable force exerted thereby, wherein said adjuster means are positioned on said hollow body such that said adjuster means can be adjusted exteriorly from said hollow body.

11. The drip irrigation emitter of claim 10, wherein said yieldable force transmitting means is an axially extending spring member and said means for varying comprises a capping bolt threadedly connected to an end of said hollow body, said spring member being retained between said collar member and the base of said capping bolt.

12. The drip irrigation emitter of claim 11, wherein said inlet connector is removable attached to said hollow body, said hollow body further including multiple outlet ports.